(12) United States Patent
Strongin et al.

(10) Patent No.: US 7,571,318 B2
(45) Date of Patent: Aug. 4, 2009

(54) METHOD AND APPARATUS FOR IMPROVED SECURITY IN A DATA PROCESSOR

(75) Inventors: Geoffrey S. Strongin, Austin, TX (US); Brian C. Barnes, Round Rock, TX (US); Rodney Schmidt, Dripping Springs, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 1324 days.

(21) Appl. No.: 10/107,633

(22) Filed: Mar. 27, 2002

(65) Prior Publication Data

US 2003/0188184 A1 Oct. 2, 2003

(51) Int. Cl.
*H04L 29/06* (2006.01)
*G06F 15/00* (2006.01)

(52) U.S. Cl. ...................... 713/166; 712/228
(58) Field of Classification Search ............... 713/189, 713/166; 711/150–160, 117, 147, 206; 712/228
See application file for complete search history.

(56) References Cited

U.S. PATENT DOCUMENTS

| | | | | | |
|---|---|---|---|---|---|
| 5,848,435 | A | * | 12/1998 | Brant et al. | 711/152 |
| 6,003,117 | A | * | 12/1999 | Buer et al. | 711/163 |
| 6,154,818 | A | * | 11/2000 | Christie | 711/163 |
| 6,516,395 | B1 | * | 2/2003 | Christie | 711/163 |
| 6,745,307 | B2 | * | 6/2004 | McKee | 711/163 |
| 6,748,592 | B1 | * | 6/2004 | Porter | 718/100 |
| 7,073,059 | B2 | * | 7/2006 | Worely et al. | 713/168 |
| 7,216,345 | B1 | * | 5/2007 | Porter | 718/100 |

OTHER PUBLICATIONS

International Search Report PCT/US02/41663, date mailed Jul. 17, 2003.
Intel: "*Intel386 DX Microprocessor 32-Bit CHMOS Microprocessor with Integrated Memory Management*" Intel Manual, Dec. 1995, pp. 34-61, XP002243542.
Intel: "*Intel Architecture Software Developer's Manual*" Intel Manual 1997, vol. 1: Basic Architecture, Chapters 3, 4 and 9 Revision 0001, XP002243543.
Takahiro Shinagawa et al. "*Exploiting Segmentation Mechanism for Protecting against Malicious Mobile Code*" Technical Report 00-02, Department of Information Science, Faculty of Science, University of Tokyo, Japan, May 17, 2000, XP002242937 www.is.i.u-tokyo.ac.jp/tech-reports/FILES.html.

* cited by examiner

*Primary Examiner*—Christian LaForgia
(74) *Attorney, Agent, or Firm*—Williams, Morgan & Amerson

(57) ABSTRACT

A method and apparatus for controlling access to segments of memory having security data stored therein is provided. A security check unit maintains information for a plurality of segments of memory regarding whether each of these plurality of segments has secure data stored therein. A hint directory maintains information regarding whether any of a plurality of these segments has secure data stored therein. The hint directory is capable of bypassing the security check unit when it receives an address that falls within a plurality of the segments that have been indicated as being free from secure data. When the hint directory determines that a received address falls within one of a plurality of segments that contain secure data, then the address is passed to the security check unit for a closer examination.

13 Claims, 5 Drawing Sheets

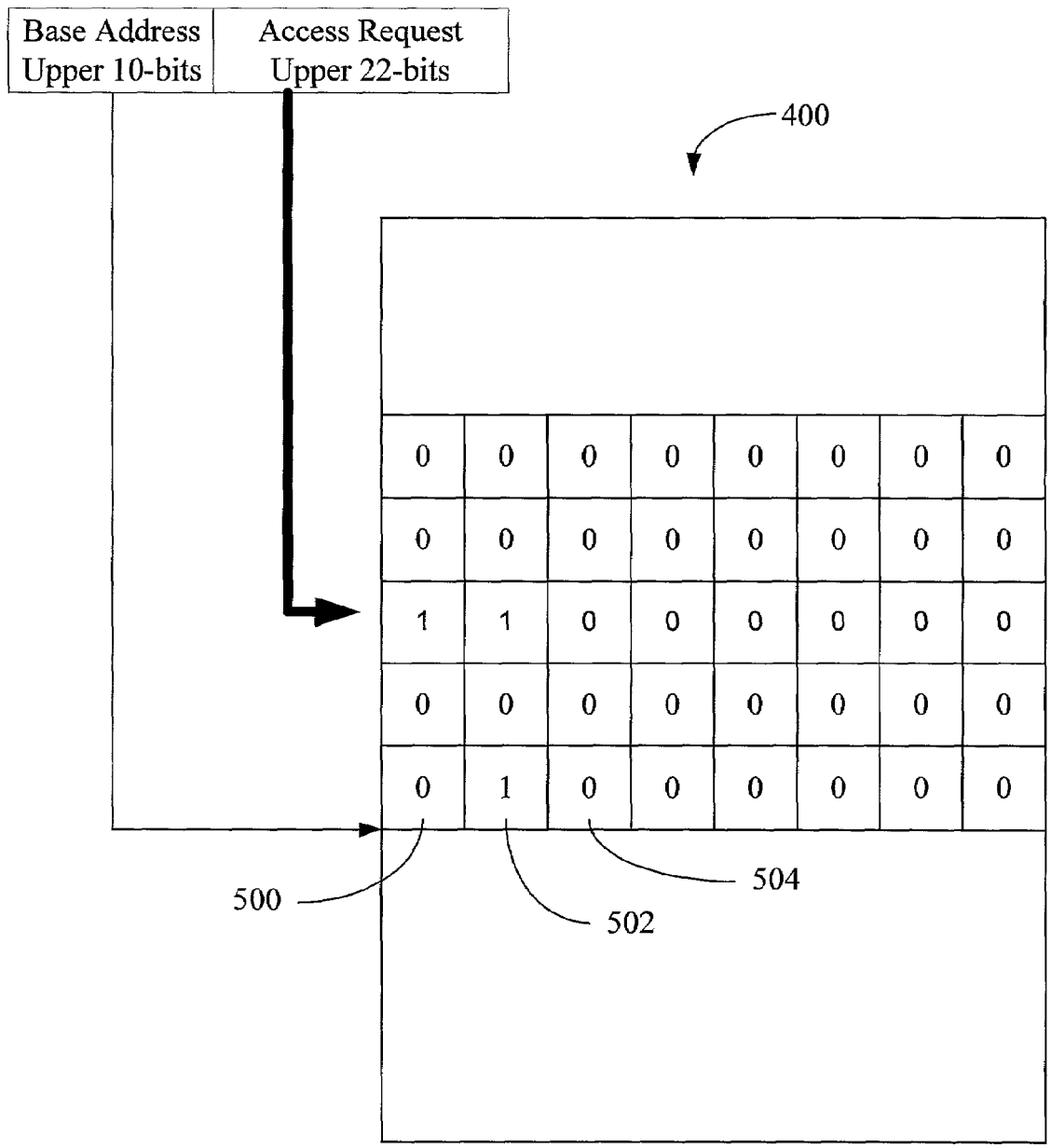

METHOD AND APPARATUS FOR IMPROVED SECURITY IN A DATA PROCESSOR

BACKGROUND OF THE INVENTION

1. Field of the Invention

This invention relates generally to a data processor, and, more particularly, to a method and apparatus for ensuring secure operation of the data processor.

2. Description of the Related Art

General purpose computing systems, such as personal computers have evolved from single task devices to multitask devices. Multitasking devices require security and protection services to protect their operating system from user processes, and to protect the processes from each other. Without protections, a rogue program, for example, could intentionally or inadvertently destroy the program code or data in the memory space belonging to the operating system or to another process.

Generally, in x86 microprocessor environments, different types of software run at varying privilege levels, and thus, have varying access to the resources of the computing system. For example, the operating system runs at the highest privilege level (Ring 0), which means that the operating system is generally free to access virtually any of the system resources. Additionally, software drivers also have a relatively high privilege level and have generally unlimited access to the resources of the computing system.

The most recent version of Microsoft's Windows® operating system, Windows 2000®, now has over one million lines of code contained in its kernel and associated kernel-mode drivers. Thus, more than one million lines of code have generally free access to the system resources. There is a significant likelihood that some security defects or other bugs exist within this massive program. Thus, it may be possible for an application program running at a relatively low privilege level to breach the security afforded by the operating system through one or more of these bugs or security defects. Alternatively, a rogue driver may also access and alter data stored in the system resources. Once allowed access to otherwise unavailable resources, such as the page table, the application program may intentionally modify data stored in memory, including the page tables. Once the page tables are modified, it may be possible to redirect the operation of the computer system to execute code from memory not originally intended. Alternatively, even an unintentional modification of the page tables could cause an application program or even the operating system to be redirected to otherwise unauthorized or unintended portions of the memory. These forays into unauthorized sections of the memory can result in one application program overwriting critical data used by another program.

In some systems, it may be useful to divide the memory into a plurality of segments, such as pages, that may have security information associated therewith. As the granularity of this information becomes greater, the amount of security data becomes greater, and thus more difficult to manage and access. For example, the time required to access a highly granular security scheme may render the operation of the system so slow that it is unworkable.

The present invention is directed to overcoming, or at least reducing the effects of, one or more of the problems set forth above.

SUMMARY OF THE INVENTION

In one aspect of the present invention, a method is provided. The method comprises a method, comprising storing first information indicating whether secure data is stored in any location within a first preselected segment of memory, and storing second information indicating whether secure data is stored in any location within each of a plurality of second preselected segments of memory. The second preselected segments of memory are smaller than the first preselected segment of memory. Thereafter, an address is received and a determination is made if at least a portion of the received address is within the first preselected segment of memory. Access to the address is permitted in response to the first stored information indicating that the first preselected segment of memory is free from secure data. At least one of the second preselected segments of memory in which the received address is located is identified in response to determining from the first stored information that the first preselected segment of memory contains secure data. Access to the received address is permitted in response to the second stored information associated with the identified second preselected segment of memory indicating that the second preselected segment of memory is free from secure data.

In another aspect of the present invention, an apparatus for controlling access to secure data stored within a segment of memory is provided. The apparatus comprises a security check unit and a hint directory. The security check unit is adapted to access first information indicating whether secure data is stored in any location within each of a plurality of first preselected segments of memory. The hint directory is adapted to store second information indicating whether secure data is stored in any one of the first plurality of preselected segments of memory. The hint directory bypasses the security check unit in response to determining that at least a portion of a received address is within at least one of the first preselected segments of memory and that the second information indicates that all of the first preselected segments of memory is free from secure data.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIG. 5 illustrates a more detailed embodiment of the memory based table of FIG. 4.

Figure 1:
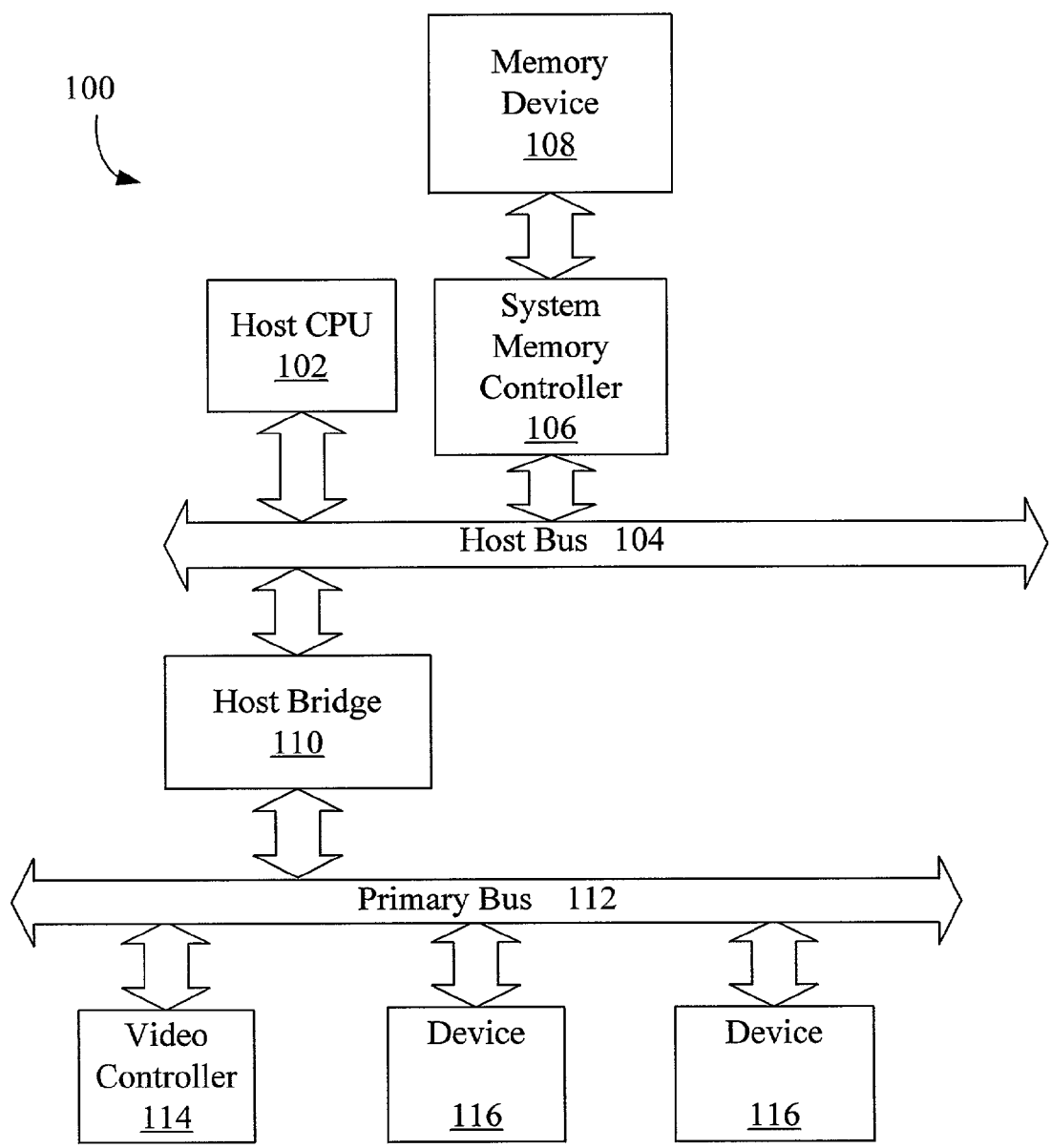
FIG. 1 schematically illustrates one embodiment of a high level block diagram of a computer system in which the instant invention may be employed.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning first to FIG. 1, a general block diagram of a computer system 100 is shown. The computer system 100 includes a processor 102, such as a microprocessor, which may include multiple processors (not shown), coupled to a host bus 104. A system memory controller 106 is coupled to the host bus 104 and a memory device 108. A host bridge 110 couples the host bus 104 to a primary bus 112, such as a peripheral component interconnect (PCI) bus (PCI Specification, Rev. 2.1). A video controller 114 and other devices 116 (e.g., PCI devices) are coupled to the primary bus 112. The computer system 100 may include other buses such as a secondary PCI bus (not shown) or other peripheral devices (not shown) known in the art.

The processor 102 communicates with the memory device 108 through the system memory controller 106. The system memory controller 106 is of a conventional construction, providing memory addresses and logic signals to the memory device 108 to characterize the desired memory transactions. The memory device 108 may take on any of a variety of forms, such as a synchronous dynamic random access memory (SDRAM), double-rate dynamic random access memory (DDRAM), or the like, without departing from the spirit and scope of the instant invention.

Figure 2:
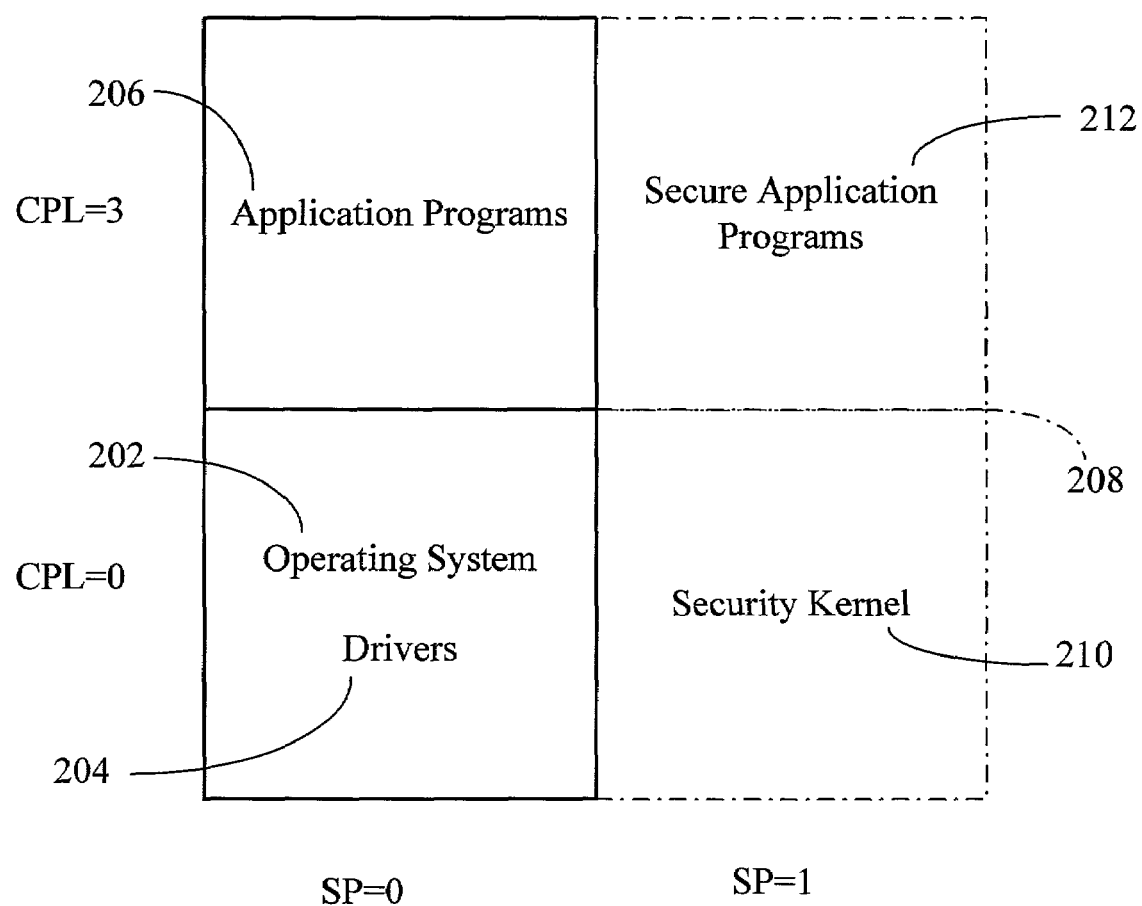
FIG. 2 schematically illustrates one embodiment of a top level diagram of an improved security system that may be employed in the computer system of FIG. 1.

As shown in FIG. 2, one illustrative embodiment of an architecture of a security system 200 that may be employed on the computer system 100 for controlling access to physical memory 108 associated with the processor 100 is shown. The system 200 is useful in a processor that uses a virtual addressing scheme for accessing memory. For example, the system 200 is useful in a processor that addresses memory using a paging scheme, such as may be found in x86 type microprocessors. Moreover, the system 200 finds particular application in a processor that assigns security attributes at the page level, such as is set forth in an application filed on Dec. 5, 2001 as application Ser. No. 10/005,271 and entitled MEMORY MANAGEMENT SYSTEM AND METHOD PROVIDING INCREASED MEMORY ACCESS SECURITY, which is assigned to the assignee of the instant application and is hereby incorporated by reference in its entirety.

In the embodiment illustrated in FIG. 2, the system 200 is added to a conventional operating system 202, such as Windows®, which is manufactured by Microsoft Corporation. Conventionally, the operating system 202 and drivers 204 are assigned a privilege level (CPL) of 0, which means that historically they have virtually unencumbered rights to access the resources of the computer system 100. Application programs 206, on the other hand, are assigned a CPL of 3, which means that historically they are intended to have very limited rights to access the resources of the computer system 100. In one embodiment of the instant invention, a secure mode 208 is positioned functionally parallel to the operating system 202, drivers 204 and application programs 206. That is, a security kernel 210 is assigned a CPL of 0 and secure application programs 206 are assigned a CPL of 3. Additionally, a security privilege level (SP) is also assigned to the operating system 202, the drivers 204, the application programs 206, the security kernel 210, and the secure application programs 212. The SP operates to differentiate the access rights of the secure mode 208 from the conventional mode. That is, the combination of the CPL and the SP allow for the security kernel to have the greatest privileges.

The security kernel 210 may have a variety of responsibilities associated with it, but the function of significance to the instant invention is its ability to store data/information/code in secure regions of the memory device 108. That is, the security kernel 210 may, owing to its high privilege level, limit access to select regions of memory. Typically, the security kernel 210 will, during an initiation phase or at subsequent times, store data/information/code within a section of the memory device 108 and then mark or otherwise identify that section as being secure. Identification of these sections of memory as secure prevents them from being accessed or changed by programs having lower privilege levels. For example, a section of memory written to and identified by the Security kernel 210 as being secure cannot be accessed by the operating system 202, the drivers 204, the secure application programs 212, or the application programs 206. These secure sections of memory are exclusively accessible by the security kernel 210.

As discussed in copending application Ser. No. 10/005,271, a CPU security check unit (SCU) is responsible for checking each memory access generated by the CPU to determine if the access falls within a region of memory previously designated as secure by the security kernel 210. It should be appreciated that the region of memory designated as secure by the security kernel 210 is smaller than a segment of memory analyzed by a hint directory, as discussed more fully below. If the region of memory has not been designated as secure, then the CPU SCU allows the memory access to proceed to an address translation mechanism, such as a paging unit. On the other hand, if the memory access falls within a secure region, then the CPU SCU analyzes the memory access to determine if the requesting agent has a sufficiently high privilege level to initiate such a request. A more detailed discussion of the operation of the CPU SCU is found in copending application Ser. No. 10/005,271, which has been previously incorporated by reference.

Figure 3:
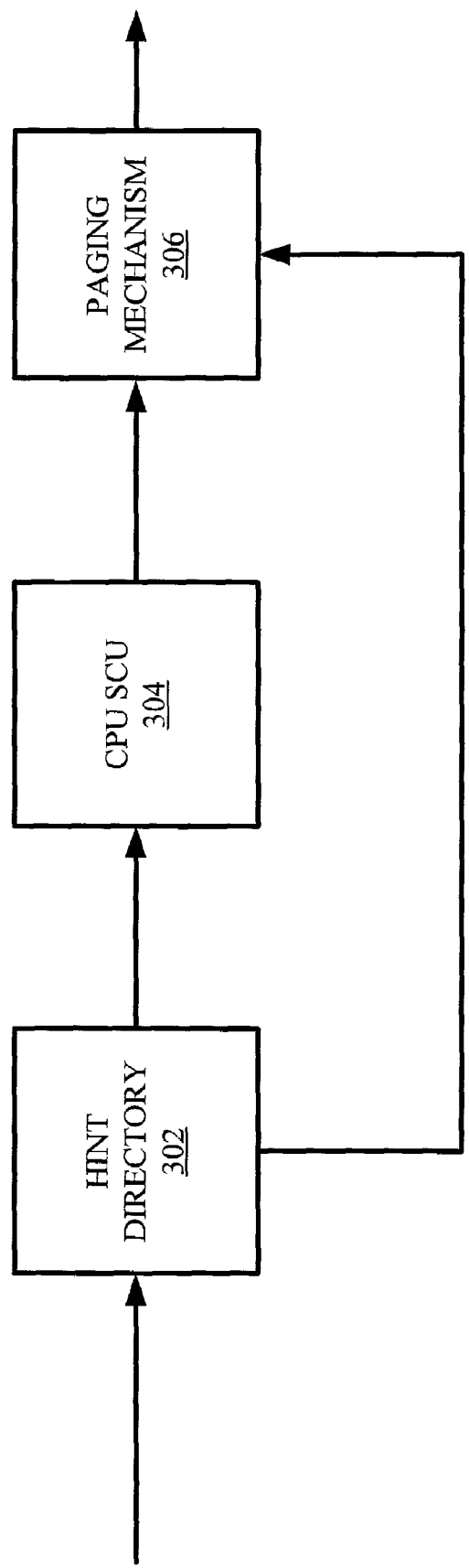
FIG. 3 schematically illustrates one embodiment of a portion of a system for controlling accesses to protected regions of memory in the computer system of FIG. 1.

As illustrated in FIG. 3, the instant invention is directed to a hint directory 302 that is located functionally in front of a CPU SCU 304. The hint directory 302 allows the system 100 to relatively quickly deduce that a memory access is not directed to a secure section of memory, and then bypass the CPU SCU 304, delivering the memory access directly to the paging mechanism 306 where a virtual or linear address of the memory access may be translated to a physical address. The hint directory keeps track of whether relatively large sections of memory have any secure sections. That is, the hint directory subdivides the memory into relatively large sections, such as one or more pages, and then sets a bit indicating whether any portion of the section has been designated as being secure. If a section of memory has no secure portions, then the CPU SCU 304 need not perform further queries to determine if the specific locations being accessed fall with a secure region, as none exist in the section.

Figure 4:
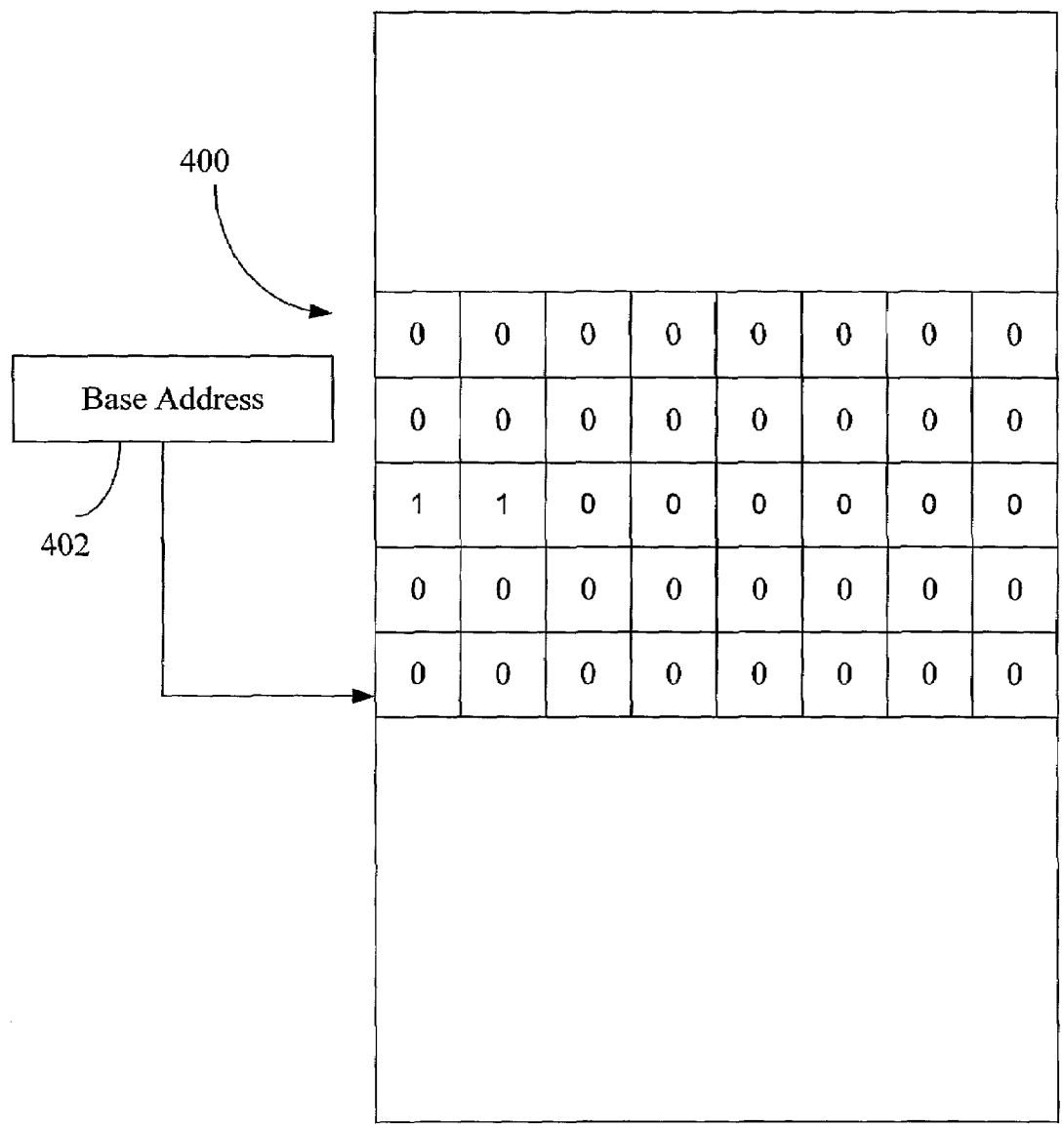
FIG. 4 illustrates one embodiment of a memory based table used for controlling access to various portions of a physical memory used by the computer system.

Turning now to FIG. 4, the hint directory 400 is schematically shown as a directory or table of entries stored in the memory device 108 beginning at a base address 402. Each entry is a single bit associated with a select segment of memory. The value stored in each entry indicates whether the security kernel has stored any data/information/code in any portion of the select segment of memory associated with that entry. That is, the entry indicates whether the associated segment of memory is secure and should be analyzed by the CPU SCU 304. The granularity of the hint directory may be varied without departing from the spirit and scope of the instant invention. That is, in some applications it may be useful to have each entry correspond to a page of memory, whereas in other applications each entry may correspond to multiple pages of memory.

For purposes of explaining the operation of the hint directory 400, it may be useful to consider a specific example, such as a system 100 that employs a 32-bit address and a hint directory that has a granularity of 2 Kbit pages. In this exemplary embodiment shown in FIG. 5, the individual cells of a 2 Kbit page are represented by the lower 10 bits of the 32-bit address, leaving the upper 22-bits to identify each page and each location within the hint directory. That is, the upper 10-bits of the base address 402 identify the starting address in memory selected by the security kernel 210, and the upper 22-bits of the access request identify a particular bit in the hint directory. For example, the 22-bit address 0000000000000000000000 identifies location 500 in the hint directory, the 22-bit address 0000000000000000000001 identifies location 502 in the hint directory, the 22-bit address 0000000000000000000010 identifies location 504 in the hint directory, and so forth.

Further, in the exemplary embodiment of FIG. 5, the locations 500 and 504 have a logically low value stored therein, indicating that none of the 2 Kbit locations associated therewith is secure. However, the location 502 has a logically high value stored therein, indicating that one or more of the 2 Kbit locations associated therewith are secure. Thus, for a memory access in the range of locations associated with either locations 500 or 504, the hint directory will cause the CPU SCU 304 to be bypassed, allowing the translation process to begin immediately. However, for a memory access in the range of locations associated with the location 502, the hint directory will cause the CPU SCU 304 to receive and analyze the memory access request to determine if it is attempting to access a secure memory location.

Those skilled in the art will appreciate that the hint directory 302 provides an indication that a memory access either definitely is not directed to a secure location or may not be directed to a secure location. The hint directory 302 directs those memory accesses that may not be directed to a secure location to the CPU SCU 304 for further analysis.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for controlling access to data stored within memory segments in a computer system having a plurality of first privilege levels, the memory segments including insecure data accessible by processes associated with a first privilege level which has limited rights to access the resources of the computer system, the method, comprising:

storing, in a hint directory, first information indicating whether secure data is stored in any location within a first preselected segment of memory;

storing a plurality of second information elements, each second information element indicating whether secure data is stored in a corresponding one of a plurality of second preselected segments of memory, wherein said second preselected segments of memory are subsets of said first preselected segment of memory;

receiving, at the hint directory, an address from a requesting agent;

determining if at least a portion of the received address is within the first preselected segment of memory;

providing said address to a paging mechanism and bypassing a security check unit in response to said first stored information indicating that said first preselected segment of memory is free from secure data, the paging mechanism being configured to translate said address to a physical address within said first preselected segment of memory;

providing said address to the security check unit in response to determining from said first stored information that said first preselected segment of memory contains secure data;

providing, from the security check unit to the paging mechanism, said received address when the security check unit determines that the second stored information element associated with the identified second preselected segment of memory indicates that said second preselected segment of memory is free from secure data; and providing, from the security check unit to the paging mechanism, said received address when the security check unit determines that the second stored in information element associated with the identified second preselected segment of memory indicates that said second preselected segment of memory contains secure data dependent on the requesting agent having a selected one of the plurality of first privilege levels and a selected one of a plurality of second privilege levels.

2. A method, as set forth in claim 1, wherein storing first information indicating whether secure data is stored in any location within a first preselected segment of memory further comprises storing a single bit of information in response to any of the plurality of second segments of memory having secured data stored therein.

3. A method, as set forth in claim 1, wherein storing the plurality of second information elements further comprises storing a plurality of second information elements that each indicate whether secure data is stored in a corresponding one of a plurality of contiguous second preselected segments.

4. A method, as set forth in claim 3, wherein determining if at least a portion of the received address is within the first preselected segment of memory further comprises determining if at least a portion of the received address is within the plurality of contiguous second preselected segments.

5. A method, as set forth in claim 1, comprising comparing the received address to an address range associated with at least one of the second preselected segments of memory.

6. An apparatus for controlling access to data stored within memory segments in a computer system having a plurality of first privilege levels, the memory segments including insecure data accessible by processes associated with a first privilege level that has limited rights to access the resources of the computer system, the apparatus comprising:
  means for storing first information indicating whether secure data is stored in any location within a first preselected segment of memory;
  means for storing a plurality of second information elements, each second information element indicating whether secure data is stored in a corresponding one of a plurality of second preselected segments of memory, wherein said second preselected segments of memory are smaller than said first preselected segment of memory;
  means for receiving an address from a requesting agent;
  means for determining if at least a portion of the received address is within the first preselected segment of memory;
  means for providing said address to a paging mechanism and bypassing a security check unit in response to said first stored information indicating that said first preselected segment of memory is free from secure data, the paging mechanism being configured to translate said address to a physical address within said first preselected segment of memory;
  means for providing said address to the security check unit in response to determining from said first stored information that said first preselected segment of memory contains secure data;
  means for providing, from the security check unit to the paging mechanism, said received address when the security check unit determines that the second stored information element associated with the identified second preselected segment of memory indicates that said second preselected segment of memory is free from secure data; and
  means providing from the security check unit to the paging mechanism, said received address when the security check unit determines that the second stored information element associated with the identified second preselected segment of memory indicates that said second preselected segment of memory contains secure data dependent on the requesting agent having a selected one of the plurality of first privilege levels and a selected one of a plurality of second privilege levels.

7. A computing system having a plurality of first privilege levels, the computing system including a memory having a plurality of segments, the memory segments including insecure data accessible by processes associated with a first privilege level which has limited rights to access the resources of the computing system, the computing system comprising:
  a security kernel associated with a selected one of the plurality of first privilege levels and a selected one of a plurality of second privilege levels, the security kernel being configured to store data in the plurality of segments and provide an indicator associated with each of the segments containing stored data, the indicator being indicative of whether the stored data is secure data, the secure data being accessible only to processes associated with the selected one of the plurality of second privilege levels;
  a hint directory adapted to store first information indicating whether secure data is stored in any one of a first plurality of preselected segments of memory based on the indicators associated with each of the segments containing stored data and to determine whether at least a portion of a received address is within at least one of the first preselected segments of memory and whether the first information indicates that each of the first preselected segments of memory is free from secure data; and
  a security check unit adapted to access a plurality of second information elements, wherein each second information element indicates whether secure data is stored in a corresponding one of a plurality of second preselected segments of memory, and wherein the security check unit accesses the second information elements in response to the hint directory determining that at least a portion of the received address is within at least one of the first preselected segments of memory and that the first information indicates that at least one of the first preselected segments of memory contains secure data,
  wherein said second preselected segments of memory are subsets of said first preselected segment of memory, and wherein the hint directory is configured to bypass the security check unit when the first information indicates that the first preselected segment of memory is free from secure data.

8. A computing system, as set forth in claim 7, wherein the hint directory is further adapted to provide the address to the security check unit in response to determining that the first information indicates that at least one of the first preselected segments of memory contains secure data.

9. A computing system, as set forth in claim 7, wherein the hint directory further comprises a table having one entry associated with a first plurality of the first preselected segments of memory and said entry is set to indicate the presence of secure data in response to any of the first plurality of the first preselected segments of memory containing secure data.

10. A computing system, as set forth in claim 9, wherein the table is stored in memory at a location indicated by at least a portion of the received address.

11. A computing system, as set forth in claim 9, wherein the table is stored in memory at a location indicated by at least a portion of higher-order bits of the received address.

12. A computing system, as set forth in claim 11, wherein the location of each entry in the table is identified by at least a portion the received address.

13. A computing system, as set forth in claim 11, wherein the location of each entry in the table is identified by at least a portion of lower-order bits of the received address.

* * * * *